United States Patent [19]

Yamazaki et al.

[11] Patent Number: 5,153,631
[45] Date of Patent: Oct. 6, 1992

[54] PHOTOMETRIC DEVICE FOR A CAMERA

[75] Inventors: Hiroshi Yamazaki; Noriyuki Osato, both of Chiba, Japan

[73] Assignee: Seikosha Co., Ltd., Tokyo, Japan

[21] Appl. No.: 682,047

[22] Filed: Apr. 8, 1991

[30] Foreign Application Priority Data

Apr. 9, 1990 [JP] Japan .................................. 2-93315

[51] Int. Cl.⁵ ............................................. G03B 7/091
[52] U.S. Cl. .................................................. 354/412
[58] Field of Search .............................. 354/410, 412; 250/214 P, 214 C, 214 D C; 356/213, 215, 218, 226

[56] References Cited

U.S. PATENT DOCUMENTS 4,423,934 1/1984 Lambeth ............................ 354/412
4,887,105 12/1989 Ishikawa et al. .................. 354/412 X
4,945,365 7/1990 Fujino .............................. 354/412 X Primary Examiner—W. B. Perkey
Attorney, Agent, or Firm—Jordan and Hamburg

[57] ABSTRACT

A camera photometric device includes a light receiving element operated by incident light for outputting photometric data. A storage arrangement stores a plurality of photometric data correction tables. An A/D converting circuit has a digital output for addressing the data correction tables stored in the storage arrangement. A variable resistor provides a variable analog voltage that is applied to the A/D converting circuit. A correction data indexing arrangement indexes the photometric data correction tables addressed by the voltage output from the variable resistor as a function of the luminance of incident light.

4 Claims, 5 Drawing Sheets

PHOTOMETRIC DEVICE FOR A CAMERA

FIELD OF THE INVENTION

The present invention is directed generally to a photometric device for a camera, and more particularly, to a camera photometric device for correcting a conversion error in a photoelectric converting process of a light receiving element or the like.

BACKGROUND OF THE INVENTION

Japanese Laid-Open patent document No. 114726/1989 discloses a conventional camera photometric device which corrects a conversion error in the photoelectric converting process of a light receiving element, using combinations of resistances and switching elements. This camera photometric device has the disadvantage, however, that while the conversion error in the photoelectric converting process can be corrected, it is impossible to correct both a deviation in characteristic of the light receiving element and a bias in general characteristics due to errors between parts of the respective units.

Japanese Laid-Open patent publication No. 135826/1988 discloses a method for recording the bias in general characteristics in a correction table, the bias including deviations in the characteristics of the light receiving element. This type of camera photometric device is provided with a plurality of high-and-low luminance photometric data correction tables. These correction tables can be designated depending on a combined state of two correction table designating switches.

In this method, however, when providing an IC-based photometric device for a camera, the number of correction tables must be increased to enhance accuracy, and the number of pin terminals of the IC package increases correspondingly. It is therefore impossible to employ standard IC packages suitable for a camera using this correction method.

SUMMARY OF THE INVENTION

It is an object of the present invention to provide a camera photometric device capable of increasing the degree of freedom of combinations of high-and-low luminance photometric data correction tables, while using an IC package, without increasing the number of pins of the IC package. This requires a step of designating the plurality of high-and-low luminance data correction tables on the basis of a digital quantity of an A/D converting circuit.

The analog quantities of the A/D converting circuit include ranges of analog quantities effective in designating the correction tables and of ineffective analog quantities. Ineffective analog quantities are interpolated between those effective analog quantities. With this arrangement, the camera photometric device is capable of preventing a mistake of designation due to variations in temperature and voltage.

To accomplish the above-mentioned object, according to the present invention, a photometric device for a camera is provided comprising a light receiving element operated by incident light, for outputting photometric data. The device further comprises a ROM for storing a plurality of photometric data correction tables for correcting photometric data output from the light receiving element; an A/D converting circuit for designating the plurality of photometric data correction tables stored in ROM as a function of a digital quantity; a variable correction table designating resistor for modifying an analog quantity for application to the A/D converting circuit; and a correction data indexing means for indexing the photometric data correction tables designated by the variable correction table designating resistor as a function of luminance of the incident light.

In the correction table designating resistor for modifying the analog quantity applied to the A/D converting circuit, ineffective analog quantities are interpolated between ranges of effective analog quantities corresponding to the correction tables to be designated.

BRIEF DESCRIPTION OF THE DRAWINGS

One embodiment of a photometric device for a camera according to the invention will now be described in detail with reference to FIGS. 1 to 4, wherein.

DESCRIPTION OF THE PREFERRED EMBODIMENTS

Figure 1:
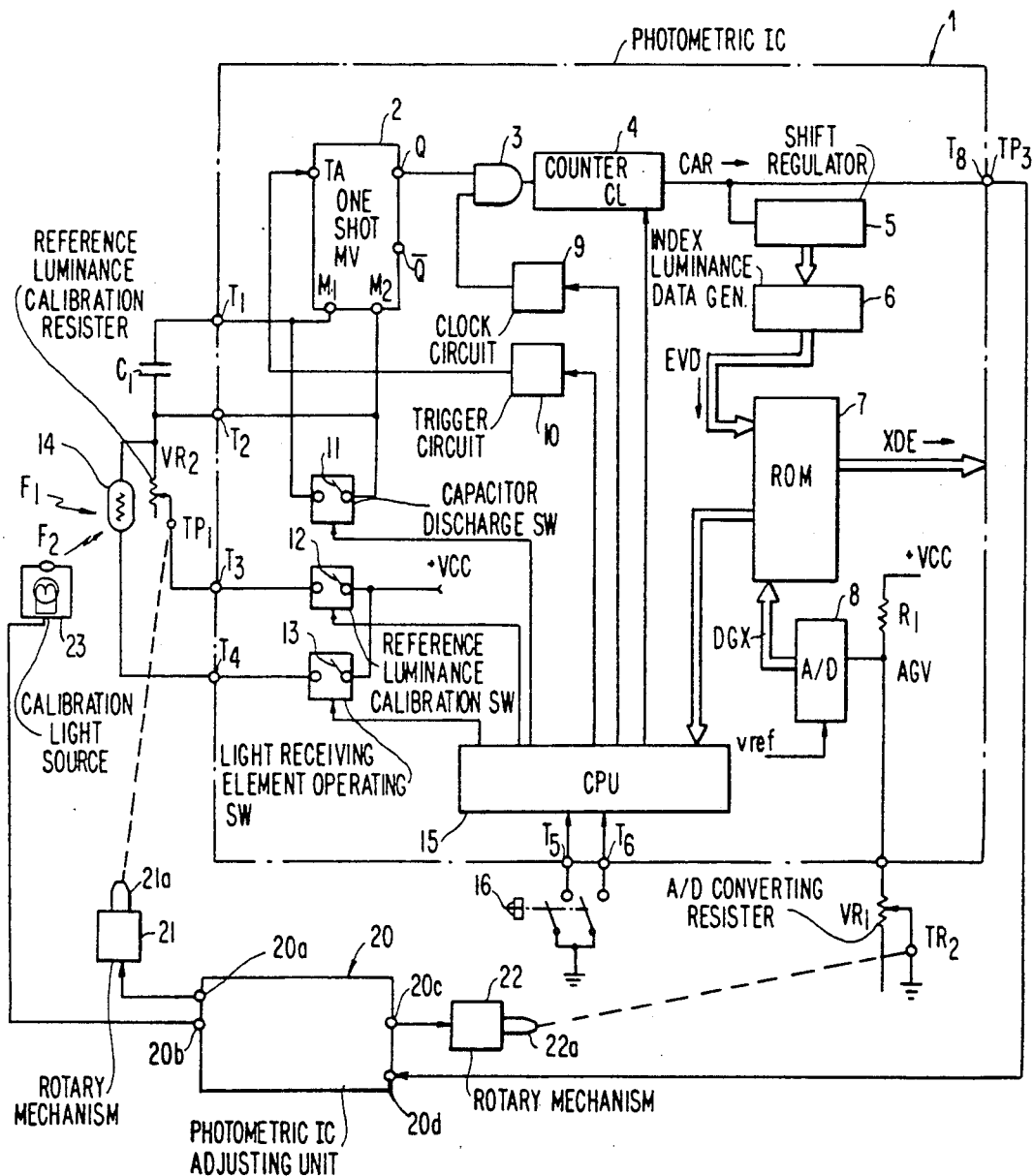
FIG. 1 is a block diagram showing one embodiment of a photometric device for a camera according to the present invention.
Figure 2:
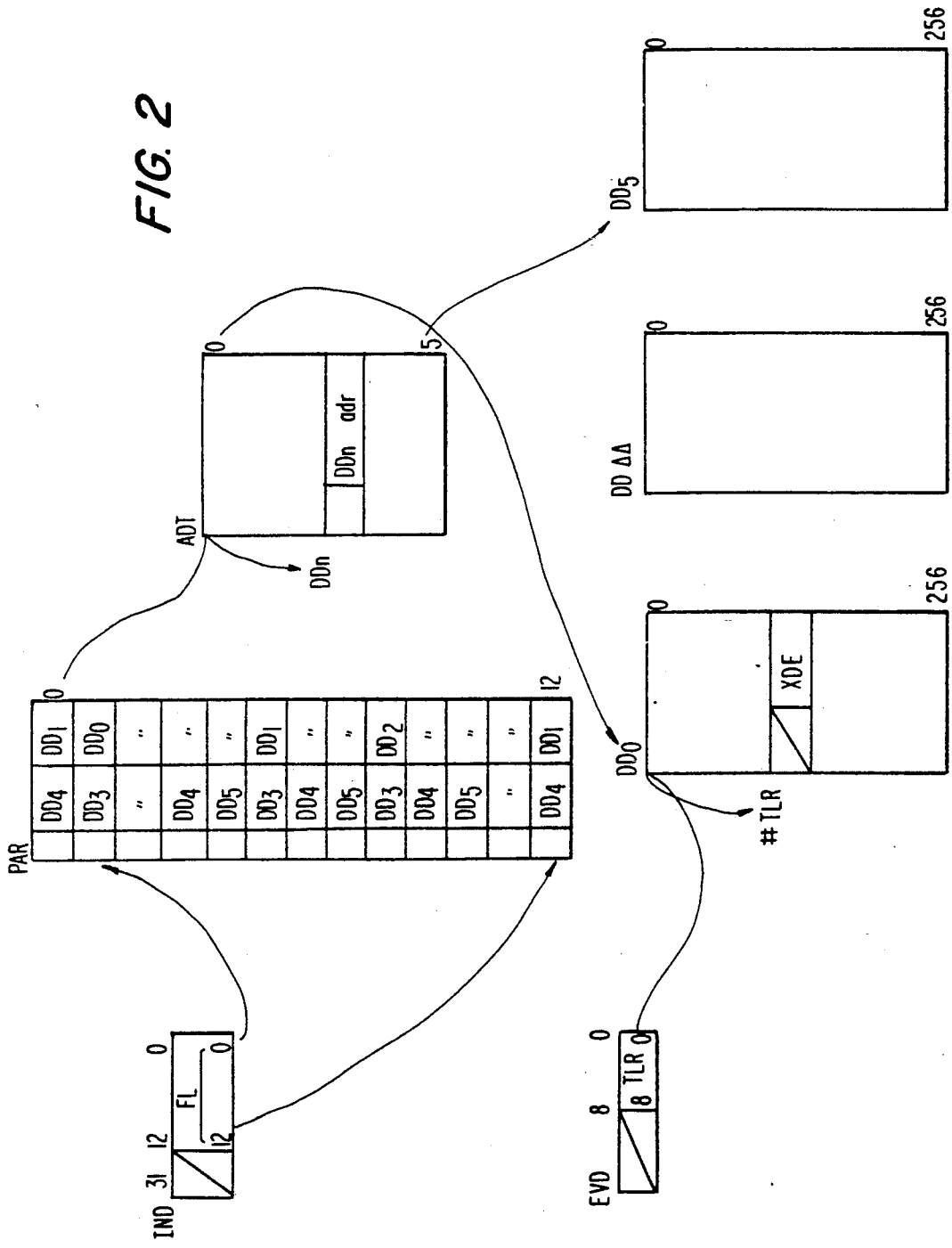
FIGS. 2, 3(A) and 3(B) are diagrams each illustrating a data structure of the camera photometric device according to this invention.

Referring to FIG. 1, the numeral 1 represents a photometric IC. The photometric IC1 comprises: a one-shot multivibrator 2; a clock gate 3; a preset counter 4 for outputting a counter carry signal CAR; a shift register 5 to which the counter carry signal CAR is input; an index luminance data generating circuit 6 for generating index luminance data EVD from the parallel output of the shift register 5; and an A/D converting circuit 8 for designating pairs of a plurality of high luminance side photometric data correction table and a plurality of low luminance side correction tables which are provided in ROM7, ROM7 on the basis of a digital quantity.

The two timing terminals $M_1$, $M_2$ of the one-shot multivibrator 2 are connected via terminals $T_1$, $T_2$ of the photometric IC1 to opposite terminals of an externally connected time constant capacitor $C_1$. When a switch 11 is closed for discharging the time constant capacitor $C_1$ connected to the timing terminals $M_1$, $M_2$, the time constant capacitor $C_1$ discharges.

One end of a variable reference luminance calibration resistor $VR_2$ is connected to one end of a light receiving element 14. This end of the variable resistor $VR_2$ is also connected to the terminal $T_2$ to which the other terminal of the time constant capacitor $C_1$ is connected. The Q-terminal of the multivibrator is connected to one input of the clock gate 3.

The other input of the clock gate 3 is connected to the output of the clock circuit 9. The output of the clock gate 3 is connected to an input of the preset counter 4.

Separate control lines of the CPU 15 are connected to a clear terminal CL of the preset counter 4, a trigger circuit 10, the time constant capacitor discharging switch 11, the reference luminance calibration switch 12 and a light receiving element operating switch 13. The program of the CPU provides control sequences for executing the steps of clearing, discharge, supply of power source + Vcc, and modification of the clock pulse period.

The CPU 15 controls the clock circuit 9 in accordance with its control sequences to selectively output two different clock pulse trains having difference periods from the clock circuit 9. The two different clock pulse trains are employed to modify the period of the counter carry signal CAR output from the preset counter 4 to the shift register 5.

When the subject luminance is, for instance, 14 EV, a luminance pulse of width TX is provided by the one-shot multivibrator 2 in association with the time constant capacitor $C_1$ and the light receiving element 14. The resistance of the variable reference luminance calibration resistor $VR_2$ is adjusted to generate a time constant equivalent to the luminance pulse of width TX. With this adjustment, the pulse at that time has a reference pulse width TS. The numeric value expressed by TX/TS is usable as the index luminance data EVD.

If the period of the above-described counter carry signal CAR is not modified, the number of pulses output from the clock circuit 9 to the counter during the luminance pulse of width TX is set to be 100 times as large as the number of pulses gated to the counter during the reference pulse of width TS. This control is provided since counts of decimal points or less can not be expressed by the parallel output of the shift register 5. More specifically, when TX/TS=1, and when the counter carry signal is 1, the parallel output of the shift register responsive to a pulse of width TS is 100. When the counter carry signal is 10, the parallel output is 1000. Accordingly, a shift register having 6 or 10 stages is employed.

A resistor $R_1$ is connected between a power source +Vcc and a terminal $T_7$. A variable resistor $VR_1$ is connected between a reference potential point and the terminal $T_7$, to form a voltage divider with the resistor $R_1$. The A/D converting circuit 8 converts the analog voltage AGV at the terminal $T_7$ of the voltage divider into a digital quantity DGX. The circuit 8 applies this digital quantity to ROM 7.

ROM 7 is provided with luminance correction tables DDn (n ranges from 0 to 5) in which pair lists PAR, address tables ADT and corrected luminance data XDE are stored in words 0–255.

Index data IND and index luminance data EVD are provided for designating a pair list PAR for indexing the luminance correction tables DDn.

Figure 3A:
Figure 3B:
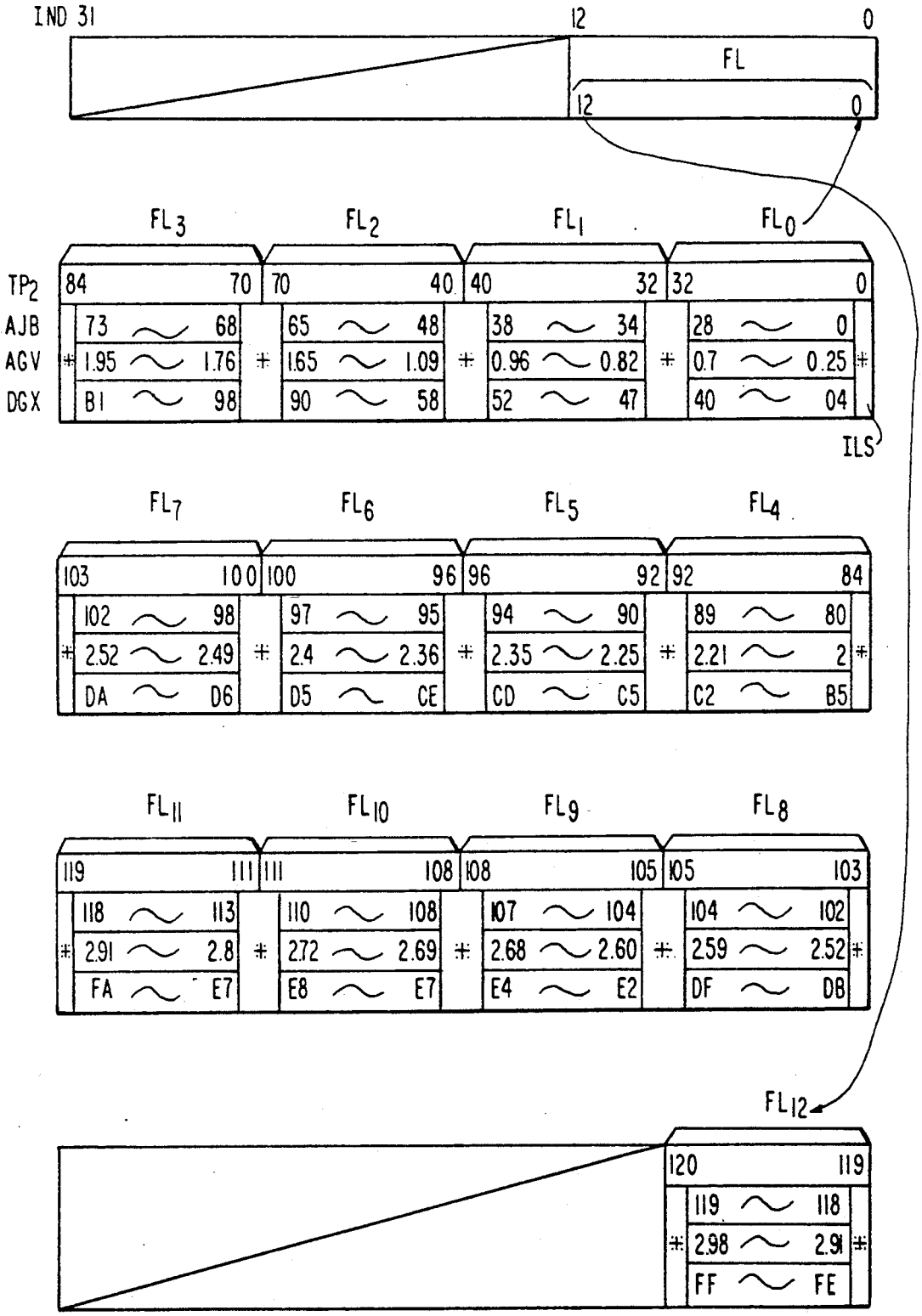

In the index data IND, as illustrated in FIGS. 3(A) and 3(B), a 32-bit working memory ranges from bit 0 to bit 31, with bits 0–12 being employed as flag bits FL. The flag bits $FL_0$–$FL_{12}$ are determined by hard logic in the A/D converting circuit 8. When determining the angular displacement of a variable A/D converting resistor rotary shaft $TP_2$ of the A/D converting variable resistor $VR_1$ externally connected to a terminal $T_7$, the analog voltage AGV and the digital quantity DGX are unequivocably determined.

Measures for overcoming noise derived from variations in temperature and voltage after effecting an adjustment are taken by interpolating idle spaces ILS (marked with * in FIG. 3(B)) between an adjusted angle Aj0, analog voltages AGV and digital quantities DGV which correspond to the flag bits $FL_0$–$FL_{12}$ of the index data IDN shown in FIG. 3(B).

The index luminance data EVD is defined as a 1-word working memory for indexing the luminance correction tables $DD_0$–$DD_5$ at index addresses TLR. The index luminance data EVD is generated by the above-mentioned index luminance data generating circuit 6. When determining the subject luminance EV shown in FIG. 4, TX/TS is determined. When determining TX/TS, the luminance correction tables $DD_0$–$DD_5$ are indexed by the index luminance data EVD, to obtain corrected luminance data XDE. The reference pulse of width TS is obtained by separately measuring a reference pulse of width $TS_1$ with EV17 as a subject luminance on the high luminance side and a reference pulse of width $TS_2$ with EV8 as a subject luminance on the low luminance side.

Figure 4:
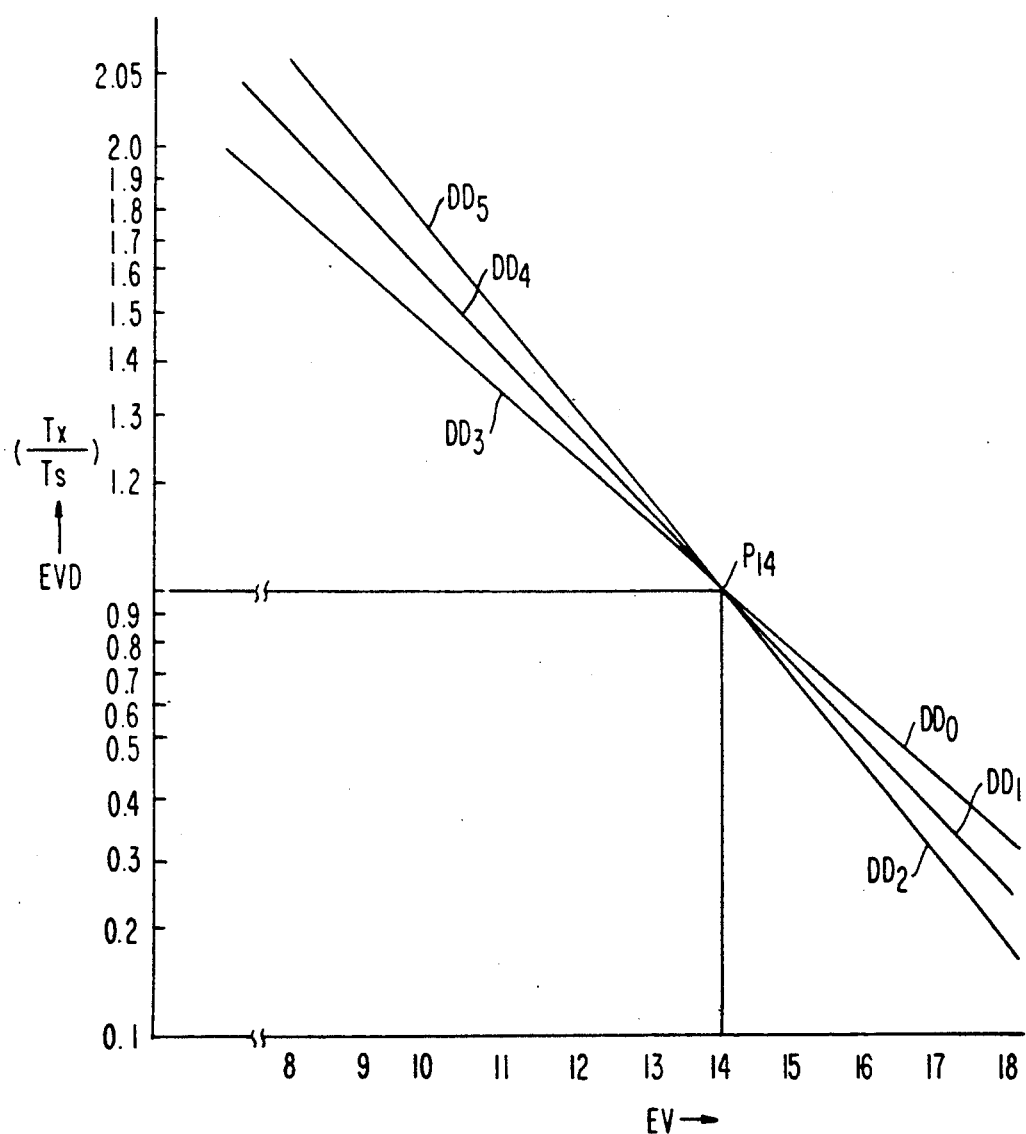
FIG. 4 illustrates characteristic curves associated with the data structure diagram of FIG. 3.

The pair list PAR is defined as a 0–12 word memory, each word corresponding to a separate flag bit $FL_0$–$FL_{12}$ of the index data IND. The low-order bits correspond to the high luminance side, while the high-order bits correspond to the low luminance side. As illustrated in FIG. 4, the luminance correction tables $DD_0$–$DD_2$ are on the high luminance side, while the luminance correction tables $DD_3$–$DD_5$ are on the low luminance side.

Combinations of the luminance correction tables $DD_0$–$DD_2$ and $DD_3$–$DD_5$ are designated by the pair list PAR. At this time, the top addresses of the luminance correction tables $DD_0$–$DD_5$ combined by the address tables ADT are determined in accordance with the designated combinations.

In each of the luminance correction tables $DD_0$–$DD_5$, when TX/TS=1 at a point $P_{14}$ of the subject luminance 14 EV, an address 0 is indexed. A numerical value [14] is written in the address 0. In the luminance correction tables $DD_0$, $DD_1$, $DD_2$, this numerical value [14] gradually increases from 14 to 18. In the luminance correction tables $DD_3$, $DD_4$, $DD_5$, the value gradually decreases from 14 to 7.

The externally connected variable reference luminance calibration resistor $VR_2$ is provided with a variable reference luminance calibration resistor rotary shaft $TP_1$ and a terminal $T_8$ for outputting the counter carry signal CAR. This terminal $T_8$ serves as an index luminance data test point $TP_3$.

A normally open contact connected via the terminals T5, T6 to CPU 15 is controlled by a release button 16.

OPERATION OF THE INVENTION

A photometric IC adjusting unit 20 depicted in FIG. 1 is used to adjust the photometric IC1 of the photometric device of a camera. The photometric IC adjusting unit 20 includes a variable calibration resistor rotary mechanism 21 having a rotary shaft 21a, a variable A/D conversion resistor rotary mechanism 22 having a rotary shaft 22a and a calibration light source 23.

The photometric IC adjusting unit 20 controls the mechanisms 21, 22 and the light source 23 via terminals 20a, 20c, 20b. The counter carry signal CAR is input from an index luminance data test point $TP_3$ to terminal 20d.

$TP_1$–$TP_3$ are set in the photometric IC1 in advance of the adjustment. The light receiving element 14 is irradiated with the light from the calibration light source 23 at the subject luminance 14 EV. The counter carry signal CAR corresponding to TX/TS is output from the terminal $T_8$ and the index luminance data test point $TP_3$. The numerical value of the counter carry signal CAR corresponds to 100 in the parallel output of a shift register (not shown) incorporated into the photometric IC adjusting unit 20. In this case, it follows that the point $P_{14}$ illustrated in FIG. 4 is confirmed. The subject luminance is next set to 17 EV. $TX/TS_1$ (the high luminance reference pulse width) is measured. When this ratio is 0.25 in FIG. 4—i.e., the parallel output of the shift register is 25, the operating region of the luminance correction table $DD_2$ corresponds to words 8, 9, 10 of the pair list PAR. This is the region of the flag bits $FL_8$, $FL_9$, $FL_{10}$ of the index data IND. When the subject luminance is 8 EV, and when $TX/TS_2$ (low luminance reference pulse width) is 1.7—viz., the parallel output of the shift register is 170, it follows that the luminance correction table $DD_3$ is designated. The flag bit at this time corresponds to $FL_8$ in the region of $FL_8$, $FL_9$, $FL_{10}$. In this case, as illustrated in FIG. 3, the $TP_2$ angle is 102° through 105°; the analog voltage AGV is 2.57 to 2.663 V; and the digital quantity DGX is hexadecimal DC-EO. Hence, the $TP_2$ angle is adjusted to 104° by the CPU incorporated into the photometric IC adjusting unit 20.

The voltage applied to the A/D converting circuit 8 is determined in accordance with a result of measuring the characteristic of the light receiving element 14. The voltage range at this time is narrowed by a determinant voltage for determining the characteristic when actually measuring the light. For this purpose, as shown in FIG. 3(B), the idle spaces are interpolated between the adjusted angle Aj0, the analog voltage AGV and the digital quantity DGV.

Theoretically, the number of words of the pair list PAR corresponding to the value of resolving power of the digital quantity DGX with respect to the analog voltage AGV can be increased. A plurality of the designated luminance correction tables DDn can also be provided. Considering the reliability of the mechanism of the A/D converting circuit 8, however, the condition becomes illegal when designating the flag bits $FL_0$, $FL_1$ and $FL_{11}$, $FL_{12}$. This implies [No correction data], and the correction may be made by standard correction data corresponding to the type of camera on the basis of other programs.

The camera photometric device according to the invention includes a light receiving element operated by incident light, for outputting photometric data. The photometric device comprises a ROM for storing a plurality of photometric data correction tables for correcting the photometric data output from the light receiving element; an A/D converting circuit for designating the plurality of photometric data correction tables stored in ROM on the basis of a digital quantity; a correction table designating a variable resistor for modifying the analog quantity of the A/D converting circuit; and a correction data indexing means for indexing the photometric data correction tables designated by the correction table designating variable resistor as a function of the luminance of the incident light. This configuration has the following advantages: It is possible to increase the degree of freedom to combine the plurality of photometric data correction tables, using a standard IC package, without increasing the number of pins of the photometric IC package.

In addition, if ineffective analog quantities are interpolated between the ranges of the effective analog quantities corresponding to the correction tables to be designated, the correction table designating resistor for modifying the analog quantity of the A/D converting circuit blocks disturbances caused by fluctuations in voltage and temperature. As a result, stable operation is obtained.

Although the present invention has been fully described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. In a camera photometric device including a light receiving element operated by incident light for outputting photometric data, the improvement comprising a ROM for storing a plurality of photometric data correction tables for correcting photometric data output from said light receiving element; an A/D converting circuit for designating said plurality of photometric data correction tables stored in said ROM as a function of a digital quantity; a variable correction table designating resistor for modifying an analog quantity of said A/D converting circuit; and a correction data indexing means for indexing said photometric data correction tables designated by said variable correction table designating resistor as a function of luminance of said incident light.

2. The camera photometric device of claim 1 comprising means for interpolating ineffective analog quantities from said correction table designating resistor for modifying the analog quantity of said A/D converting circuit.

3. In a camera photometric device including a light receiving element operated by incident light, for outputting photometric data, the improvement comprising:
storage means for storing a plurality of photometric data correction tables; an A/D converting circuit having a digital output for addressing said data correction tables stored in said storage means; a variable resistor for providing a variable analog voltage, means for applying said variable analog voltage to said A/D converting circuit; and correction data indexing means coupled to said variable resistor for indexing photometric data correction tables addressed by the output of said variable resistor, as a function of luminance of said incident light.

4. The camera photometric device of claim 3, wherein said storage means comprises a ROM.

* * * * *